March 24, 1964     A. Y. DOWELL     3,126,006
FISHBONE EXTRACTOR
Filed Aug. 14, 1961
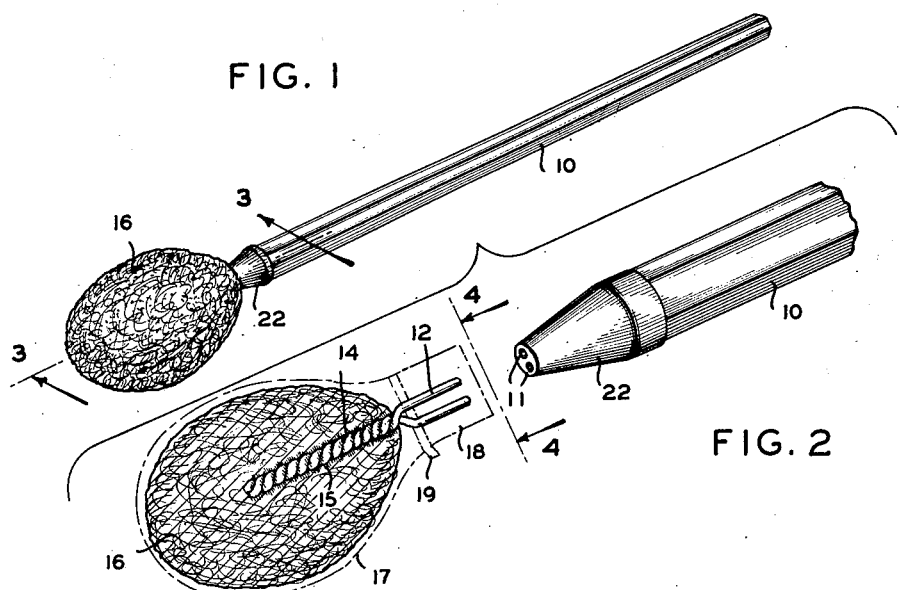
FIG. 1
FIG. 2
FIG. 3
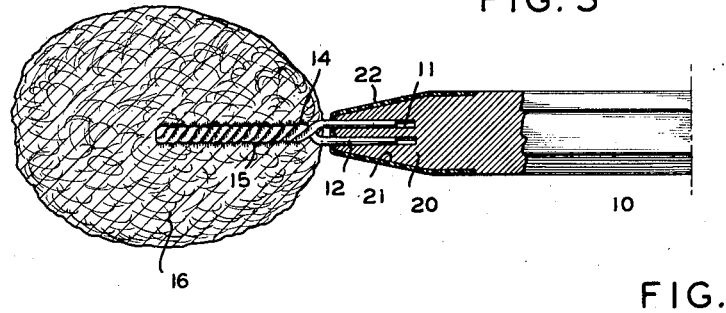
FIG. 5
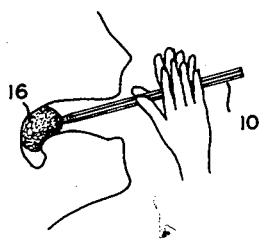
FIG. 6
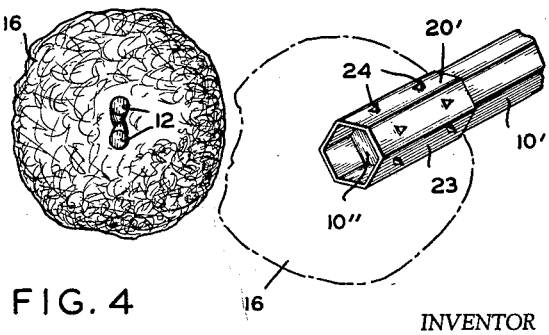
FIG. 4
INVENTOR

United States Patent Office 3,126,006
Patented Mar. 24, 1964

3,126,006
FISHBONE EXTRACTOR
Alvis Yates Dowell, 3026 Newark St., Washington 4, D.C.
Filed Aug. 14, 1961, Ser. No. 131,172
1 Claim. (Cl. 128—356)

This invention relates to objects and equipment maintained around living quarters and elsewhere for convenience and use and it includes devices for the first-aid treatment in the event of minor mishaps and intended to supply the needs without enlisting professional aid or assistance.

The invention relates particularly to objects of the kind ordinarily kept in medicine cabinets, first-aid kits and other convenient locations, and especially to a handy device by which fish bones and other small sharp objects which sometimes become lodged in the throat may be easily, simply and readily removed.

In the eating of certain foods, especially fish and the like, containing or filled with small bones, considerable discomfort has been experienced on account of the lodging of the bones in the mouth and throat, and difficulty has been experienced in the dislodging and removing of such bones. Attempts have been made to solve the problem by the eating of bread and other soft materials and in other ways, but often it has been necessary to take the patient to a hospital or to enlist the service of a physician in order to overcome the difficulty.

It is an object of the invention to provide a simple, inexpensive, effective device, by which small, sharp objects, including bones from fish or the like are lodged in the throat, may be easily, simply and quickly removed with minimum mental and physical distress, thereby freeing the individual of fear and permitting the continuation of the eating of fish at such or later time and knowing that if such bones become lodged in the throat they may be readily removed.

Other objects and advantages of the invention will be apparent from the following description taken in conjunction with the accompanying drawing, wherein:

FIG. 1 is a perspective illustrating one application of the invention;

FIG. 2, an enlarged fragmentary view with parts in section;

FIG. 3, a similar view with the parts assembled;

FIG. 4, a section on the line 4—4 of FIG. 2;

FIG. 5, a modified type of lint holder; and

FIG. 6, a view illustrating the manner of use of the device.

Briefly stated the invention is a holder with projections on which lint cotton is adapted to be received and held, the holder preferably being elongated and multi-sided so that it can be held between the hands and rotated. It is of course intended that the amount of cotton employed on the holder be sufficient to completely fill the oral cavity. The invention further contemplates pre-formed masses of cotton of spherical or ball form and mounted on wire or other base detachable from the holder or handle so that the base and the ball of cotton can be discarded after use.

With continued reference to the drawing an elongated holder or handle 10 is provided of sufficient length to be rotated between the hands while one end is within the mouth or throat. The holder is provided with a pair of longitudinal openings 11 in which are adapted to be received spaced prongs 12 which constitute the terminals of a disposable head including a pair of entwined coils 14. Between the coils 14 are mounted bristles 15 adapted to receive, engage and entangle thereon a mass 16 of lint cotton or other fine fibrous mass all of which may be carried in a container such as a plastic envelope 17 having a removable cover 18 and a tear strip 19 for facilitating the opening of the bag to provide access to the contents.

The multi-sided handle 10 may have a reduced extremity 20 and a frusto-conical portion 21 covered by a sheath 22. Thus the handle 10 with the disposable head including the mass of lint and the mounting therefor may be carried in a package with the lint ball protected by a bag 17 but readily exposable by pulling a tape 19 whereupon the prongs 12 may be readily inserted in the openings 11 and the handle 10 whereupon the ball of lint while on the handle can be inserted through the mouth into the throat and the handle rotated between the palms of the hands thereby causing the lint to enter the various crevices and engage and surround any small bone or foreign matter especially having sharp penetrating ends whereby upon the removal of the device from the throat the bones likewise will be removed.

In FIG. 5, a handle 10' is shown having a relatively square end portion 10" with a reduced portion 20' on which is received a hexagonal sleeve or head 23 having portions stuck outwardly from such hexagonal sleeve to provide penetrating portions 24 otherwise the handle with the lint engaging structure namely, the projections 24, can be employed as a core about which a ball or sphere of lint cotton can be engaged for use in the manner described.

It will be apparent that a relatively simple inexpensive and practicable device is provided of inestimable value in removing bones with sharp projections and other foreign matter from the throat.

It will be obvious to one skilled in the art that various changes may be made in the invention without departing from the spirit and scope thereof and therefore the invention is not limited by that which is illustrated in the drawing and described in the specificaton, but only as indicated in the accompanying claim.

What is claimed is:

A device for removing fish bones from the throat of human beings comprising an elongated handle of a length and thickness to be readily held between the palms of the hands, said handle having means to facilitate the rotation thereof, a head removably mounted on one end of said handle, said head including a first portion at one end with a plurality of projections thereon, a mass of soft fibrous material mounted on said first portion and secured thereon by said projections, said fibrous material being of a size substantially to fill the throat when in use and thereby engage substantially the entire throat surface so that the fishbones become entangled therein when the head is rotated thereby dislodging the fishbones, said head having a handle-engaging portion at the other end, said handle-engaging portion including non-positive friction means slidably interfitted with said handle for maintaining said head and said handle in assembled relationship and preventing relative rotation therebetween.

References Cited in the file of this patent

UNITED STATES PATENTS

| | | |
|---|---|---|
| 355,308 | Foote | Jan. 4, 1888 |
| 680,936 | McCully | Aug. 20, 1901 |
| 874,495 | Gaterman | Dec. 24, 1907 |
| 1,853,238 | Shields | Apr. 12, 1932 |
| 2,842,790 | Castelli | July 15, 1958 |
| 2,893,029 | Vosbikian et al. | July 7, 1959 |
| 3,085,272 | Weichselbaum | Apr. 16, 1963 |

FOREIGN PATENTS

| | | |
|---|---|---|
| 544,870 | Great Britain | Apr. 30, 1942 |